(12) United States Patent
Philiben et al.

(10) Patent No.: US 6,940,424 B2
(45) Date of Patent: Sep. 6, 2005

(54) HAZARD AVOIDANCE SYSTEM

(75) Inventors: Scott Philiben, Bend, OR (US); Bradley F. Blackwell, Huron, OH (US)

(73) Assignee: Precise Flight, Inc., Bend, OR (US)

( * ) Notice: Subject to any disclaimer, the term of this patent is extended or adjusted under 35 U.S.C. 154(b) by 101 days.

(21) Appl. No.: 10/286,570

(22) Filed: Nov. 1, 2002

(65) Prior Publication Data

US 2003/0090391 A1 May 15, 2003

Related U.S. Application Data

(60) Provisional application No. 60/335,486, filed on Nov. 13, 2001.

(51) Int. Cl.$^7$ ................................................ G08B 21/00
(52) U.S. Cl. .................. 340/945; 340/435; 340/436; 340/463; 340/468; 340/947; 340/961; 340/988
(58) Field of Search .................. 340/945, 426.19, 340/426.22, 426.23, 435, 463, 468, 471, 472, 901, 436, 903, 947, 961, 988; 180/271; 701/213, 200

(56) References Cited

U.S. PATENT DOCUMENTS

| | | | |
|---|---|---|---|
| 531,653 A | | 1/1895 | Selden |
| 2,960,679 A | | 11/1960 | Atkins |
| 3,903,501 A | | 9/1975 | Greenlee et al. |
| 4,256,366 A | * | 3/1981 | Buckelew .................. 359/548 |
| 4,736,907 A | | 4/1988 | Steffen |
| 5,270,707 A | | 12/1993 | Schulte et al. |
| 5,293,304 A | | 3/1994 | Godfrey |
| 5,319,367 A | | 6/1994 | Schulte et al. |
| 5,515,026 A | * | 5/1996 | Ewert ...................... 340/436 |
| 5,774,088 A | | 6/1998 | Kreithen |
| 5,777,563 A | * | 7/1998 | Minissale et al. .......... 340/903 |
| 5,914,651 A | * | 6/1999 | Smalls ...................... 340/436 |
| 5,939,987 A | * | 8/1999 | Cram ....................... 340/573.2 |
| 5,983,161 A | * | 11/1999 | Lemelson et al. .......... 701/301 |
| 6,155,694 A | | 12/2000 | Lyons et al. |
| 6,250,255 B1 | | 6/2001 | Lenhardt et al. |
| 6,252,525 B1 | * | 6/2001 | Philiben .................... 340/961 |
| 6,502,035 B2 | * | 12/2002 | Levine ...................... 701/301 |

FOREIGN PATENT DOCUMENTS

DE 19858204 6/2000

* cited by examiner

*Primary Examiner*—Davetta W. Goins
(74) *Attorney, Agent, or Firm*—Chernoff, Vilhauer, McClung & Stenzel, LLP

(57) ABSTRACT

A hazard avoidance system for a vehicle utilizes data related to a location of a collision threat, conditions at the location, and vehicle operating parameters to select a light illumination routine that is optimal to attract the attention of and repel a collision hazard.

24 Claims, 4 Drawing Sheets

HAZARD AVOIDANCE SYSTEM

CROSS-REFERENCE TO RELATED APPLICATIONS

This application claims the benefit of U.S. Provisional Application No. 60/335,486, filed Nov. 13, 2001.

STATEMENT REGARDING FEDERALLY SPONSORED RESEARCH OR DEVELOPMENT

Not applicable.

BACKGROUND OF THE INVENTION

The present invention relates to a hazard avoidance system and, more particularly, a system for alerting and repelling animals posing a threat of vehicular collision.

Collisions between birds and aircraft occur wherever they share the same airspace. More than 5700 bird collisions or strikes with U.S. civil aircraft were reported in 2001 and it is estimated that 80% of bird strikes are not reported. The consequences of a collision between an aircraft and an animal depend, in part, on the sizes of the aircraft and the animal, the number of animals that are struck, and the location of the strike on the aircraft. However, a collision between an aircraft and an animal presents a serious hazard to the aircraft and more than 130 people have been killed worldwide since 1995 as result of collisions between birds and aircraft. The annual cost to U.S. civil aviation of collisions between birds and aircraft is estimated at $400 million per year.

While bird strikes are the major animal collision hazards for aircraft, mammals also pose a significant hazard. For example, bats present a significant in-flight hazard in some locales. Collisions between aircraft and coyotes, caribou, and elk have been reported and more than 500 collisions between deer and civilian aircraft were reported in the U.S. between 1990 and 2001.

Various methods are employed to reduce the hazard of animal collisions with aircraft. Since most birds fly at low altitudes, typically less than a few hundred feet, about 80% of bird strikes on civilian aircraft occur during takeoff and landing. Likewise, non-flying animals threaten aircraft during taxiing, take-off, and landing. As a result, several tactics to disperse or otherwise control animals are employed at airports. Typically, these methods employ selective hunting of problem species and non-lethal methods using frightening noises or sights. However, in many cases the problem species is a protected species and hunting is illegal. Non-lethal tactics can sometimes be used effectively in controlling transient migratory species, but usually the effectiveness of these techniques is short lived. Habitat modification, intended to deprive animals of food, shelter, space, and water, on an airport is the most effective longer term tactic for reducing the population of animals sharing space with aircraft that are taxiing, taking-off, and landing.

While the risk of collision to aircraft during taxiing, taking-off, and landing can be reduced by various techniques that modify the airport environment, these methods are only partially effective and have a limited geographic range. Although collisions occurring during the climb, cruise, and descent portions of a flight are less likely, they are likely to be more hazardous because they often involve large soaring birds or migrating flocks of waterfowl. To further reduce the potential of collisions between animals and aircraft throughout the flight, systems have been added to aircraft to warn the crew of the presence of birds and to encourage birds to avoid the path of the aircraft. For example, Steffen, U.S. Pat. No. 4,736,907, discloses an apparatus for preventing bird collisions comprising a plurality of lights that flash with continuously varying frequency. Increasing the frequency of light flashes has been found be more effective in causing an escape reaction in some birds and increasing the flash frequency for two separated light sources makes the vehicle appear to be moving closer at a high rate of speed increasing the acuteness of the escape reaction. A microprocessor-based control for the flashing lights permits storage of a plurality of flashing frequencies and cycles permitting the flight crew to select one of the light flashing routines appropriate to the speed of the plane when a collision hazard is anticipated.

A collision avoidance system enabling a plurality of light flashing patterns provides an opportunity to select a more effective response to a hazard. However, the flight crew must locate and identify a hazard to the aircraft and select a light flashing pattern with which to respond, often while engaged in tasks related to taking-off and landing. In the alternative, the flight crew can select a light flashing pattern, that is either manually initiated or automatically initiated by radar, and allow the system to operate until a collision indicates that the selected flashing pattern is ineffective.

What is desired, therefore, is a hazard avoidance system that can, with minimal manual intervention, select and initiate a light illumination routine that is effective to repel an anticipated collision threat.

DETAILED DESCRIPTION OF THE INVENTION

Figure 1:
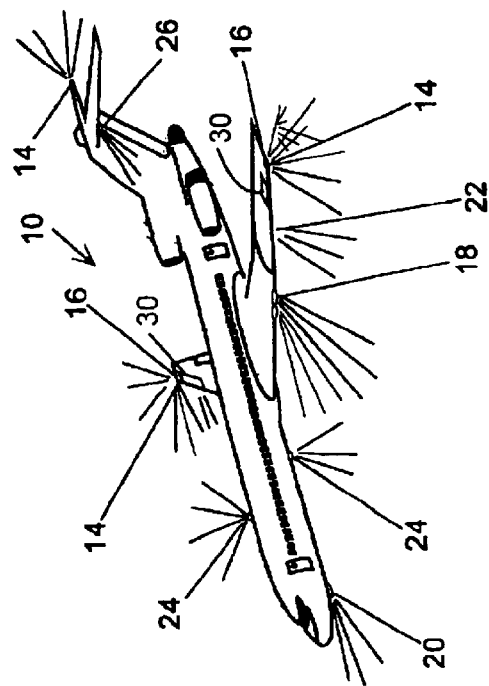
FIG. 1 is a perspective-view of an aircraft and an animal collision hazard.
Figure 1:
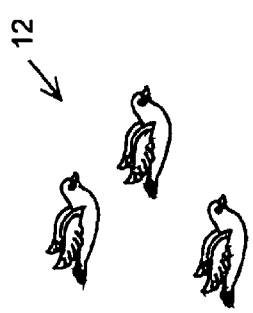

Referring in detail to the drawings wherein similar parts of the invention are identified by like reference numerals, and specifically to FIG. 1, the hazard avoidance system comprises, generally, a plurality of lights attached to the exterior of a vehicle, such as an airplane 10; and a controller to periodically illuminate one or more of the lights to attract the attention of and repel animals 12 presenting a risk of collision to the vehicle.

An aircraft is typically equipped with position lights 14, and, one or more, flashing anti-collision lights 16 to alert humans, such as traffic controllers and other aircrews, of the location and direction of the aircraft. In addition, aircraft are typically equipped with a combination of landing lights 18, taxi lights 20, strobe lights 24, deicer lights 22 and lights to illuminate the aircraft's rudder 26. The hazard avoidance system may utilize existing vehicle lights, such as the position 14, anti-collision 16, landing 18, and taxi 20 lights of an aircraft but it may not be feasible or appropriate to use existing lights and the hazard avoidance system may utilize lights 30 that are dedicated for the use of the system. While aircraft include a number of light emitters useful in aiding human observers in locating the aircraft, the large numbers collisions between aircraft and birds and other animals indicate that the performance of these systems is less than optimal in attracting the attention of and repelling other animals. Studies indicate that other animals, such as birds, perceive the world differently from humans. For example, while human vision cannot detect light in the ultraviolet (UV) range, birds have UV vision. Likewise, whereas human eyes contain three interacting cone types producing trichromatic color vision, birds typically have four interacting cone types. Other animals presenting a hazard to aircraft or other vehicles may have only two interacting cone types and some animals are known to have up to five cone types. Since color is a property of the nervous system of the animal viewing an object and not a property of the viewed object, optical systems designed to attract the attention of humans are likely to be less effective in attracting the attention of other animals that perceive light differently. However, even optical systems intended to provide a more intense response by a bird's nervous system often prove ineffective.

The present inventors concluded that there are substantial differences between the different species encountered by a vehicle as it travels to different locales and that a hazard avoidance system optimized to stimulate an idealized nervous system of a class of animals or a certain species is likely to be less effective in repelling animals of another species or class. For examples, most birds have eyes on the side of the head and, therefore, have monocular vision. On the other hand, raptors, with eyes placed near the front of the head, have binocular vision and have much sharper vision to the front than birds with monocular vision. Likewise, nocturnal birds, such as owls, typically have more rod cells in the eye enabling the bird to see in low light conditions. However, discerning color is not particularly useful in low light conditions and birds that feed in the daylight have many more cone cells and can perceive color much better than nocturnal birds. In addition, the surface of cone cells in the eyes of some birds are coated with special light filtering oil droplets making the cones more sensitive to a narrow range of colors. For example, some sea birds, which may be encountered at coastal airfields, have an oil that filters blue light scattered by the sea, improving the bird's ability to discern small objects on or near the surface. The present inventors concluded that a system adaptable to optimize the nervous system response of animals likely to be encountered by the vehicle could substantially improve the effectiveness of a hazard avoidance system.

Figure 2:
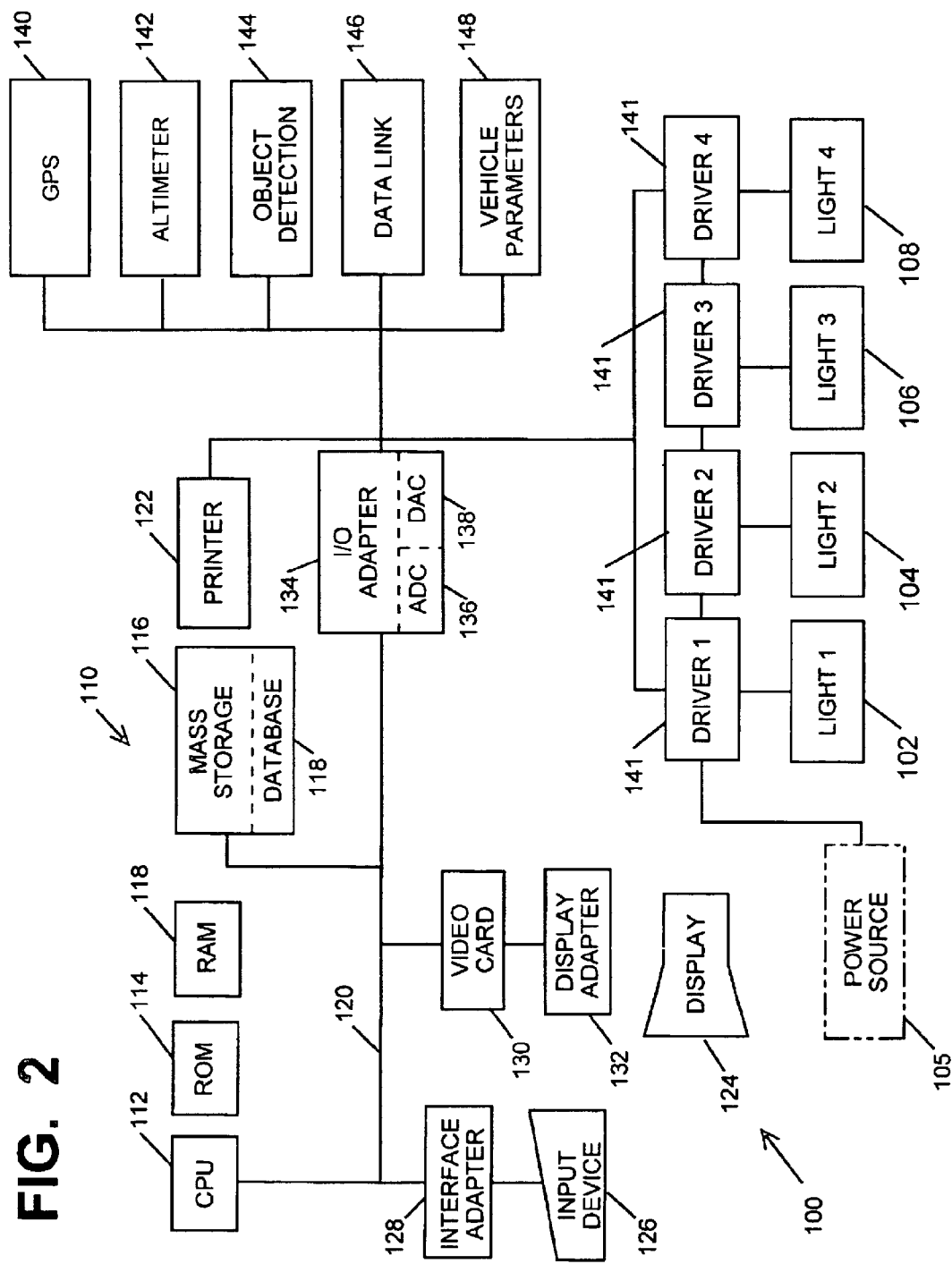
FIG. 2 is a block diagram of the hazard avoidance system.

Referring to FIG. 2, the hazard avoidance system 100 comprises generally a plurality of lights 102, 104, 106, 108 and a data processing system 110 to adaptively control operation of the lights. The hazard avoidance system 100 may be installed on a wide variety of vehicles and, therefore, may take a number of configurations. Likewise, the system may be controlled by different of types of data processing equipment. The block diagram of FIG. 2 depicts a hazard avoidance system 100 controlled by a data processing system similar to a personal computer system. The data processing system may be integral to a vehicle's on-board computer system or may be a stand-alone system capable of communicating with the vehicle's computer system and with a number of independent instruments and transducers providing data related to the performance and configuration of the vehicle and conditions of the surrounding environment. The exemplary data processing system 110 includes a microprocessor-based, central processing unit (CPU) 112 that fetches data and instructions from a plurality of sources, processes the data according to the instructions, and stores the result or transmits the result in the form of signals to control some attached device, such as the lights 102, 104, 106, 108. Typically, basic operating instructions used by the CPU 112 are stored in nonvolatile memory or storage, such as read only memory (ROM) 114. The instructions and data used by application programs are typically stored on a nonvolatile mass storage device or memory 116, such as a disk storage unit. The data and instructions are typically transferred from the mass storage device 116 to random access memory (RAM) 118 and fetched from RAM by the CPU 112 during execution. Data and instructions are typically transferred between the CPU 112, ROM 114, and RAM 118 over an internal bus 120.

The exemplary data processing system 110 also includes a plurality of attached devices or peripherals, including a printer 122, a display 124, and one or more user input devices 126, such as a keyboard, mouse, or touch screen. Under the control of the CPU 112, data is transmitted to and received from each of the attached devices over a communication channel connected to the internal bus 120. Typically, each device is attached to the internal bus by way of an adapter, such as the interface adapter 128 providing an interface between the input device 126 and the internal bus 120. Likewise, a display adapter 130 provides the interface between the display 124 and the video card 132 that processes video data under the control of the CPU 112. The printer 122 and similar peripheral devices are typically connected to the internal bus 120 by one or more input-output (I/O) adapters 134.

The I/O adapter 134 commonly provides an analog-to-digital converter (ADC) 136 and a digital-to-analog converter (DAC) 138 to convert analog signals received from various transducers inputting data to the data processing system 110 to digital signals suitable for processing by the CPU 112 and to convert the digital signals output by the CPU to analog signals that may be required by certain peripheral equipment attached to the data processing system. The hazard avoidance system 100 typically receives data from a number of instruments and transducers mounted on the vehicle. For examples, the hazard avoidance system may receive data related to the position of the vehicle from the vehicle's global positioning system 140 or other navigation system, vehicle altitude data may be received from the GPS or an altimeter 142, and data related to the presence of hazards may be received from an object detection system 144, such as radar, sonar, or an infrared light (IR) sensor. In addition, the data processing system 110 may receive data concerning potential hazards from remote observers through a data link and data related to the operating parameters 148 of the vehicle from a variety of transducers sensing the characteristics of the vehicle and its surroundings.

The data processing system 110 operates one or more lights 102, 104, 106, 106 of the animal collision avoidance system in accordance with a plurality of routines in an application program stored on the mass storage unit 116. The application program typically includes a database 118 relating a plurality animal identities to a plurality of vehicle operating regimes and a plurality of light illumination routines selected to optimize the avoidance behavior of animals identified as collision threats. A light illumination routine comprises an instruction, executable by the data processing system, that identifies at least one exterior vehicle light to be illuminated in response to an animal collision threat, an illumination pulse frequency for the identified light, and the characteristics of the illumination pulse.

The lights 102, 104, 106, 108 utilized by the hazard avoidance system may include existing vehicle lights, such as the position lights 14, landing lights 18, strobe lights 24, and deicer lights 22 of an airplane. However, these lights are installed on the airplane for existing purposes and their use for a new purposes may not be possible or may be limited by operation of the vehicle. For example, during taxiing, it may not be possible to operate the taxi lights in a manner effective in repelling animals posing a collision threat but it may be possible to utilize the landing lights for this purpose. Likewise, the pulse frequencies and the frequencies of light emitted by the strobe lights 24 are established by regulation to aid human observers in locating the aircraft and cannot be altered to suit other purposes. Unless the pulse frequency and frequency of light emitted by the strobe lights is coincidently suited to repelling a species of animals, other lights must be used. The hazard avoidance system may utilize the existing vehicle lights as appropriate for the identified animal hazard and the operating parameters of the vehicle and may also utilize lights 30 dedicated to the hazard avoidance system.

Figure 3:
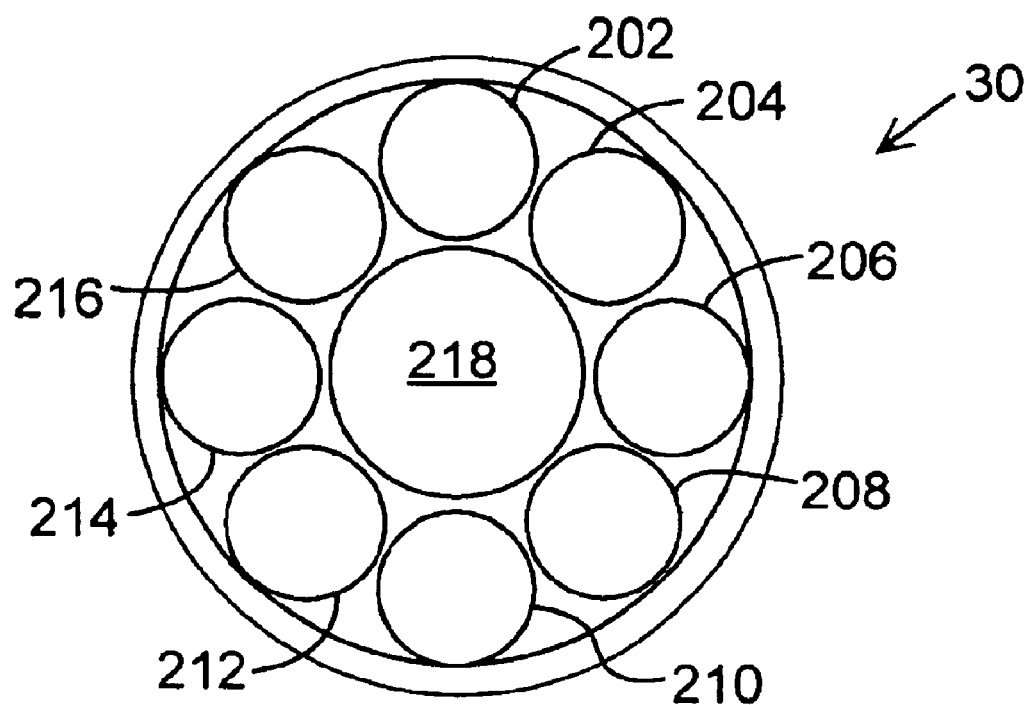
FIG. 3 is an elevation view of a light array for use with a hazard avoidance system.
Figure 4:
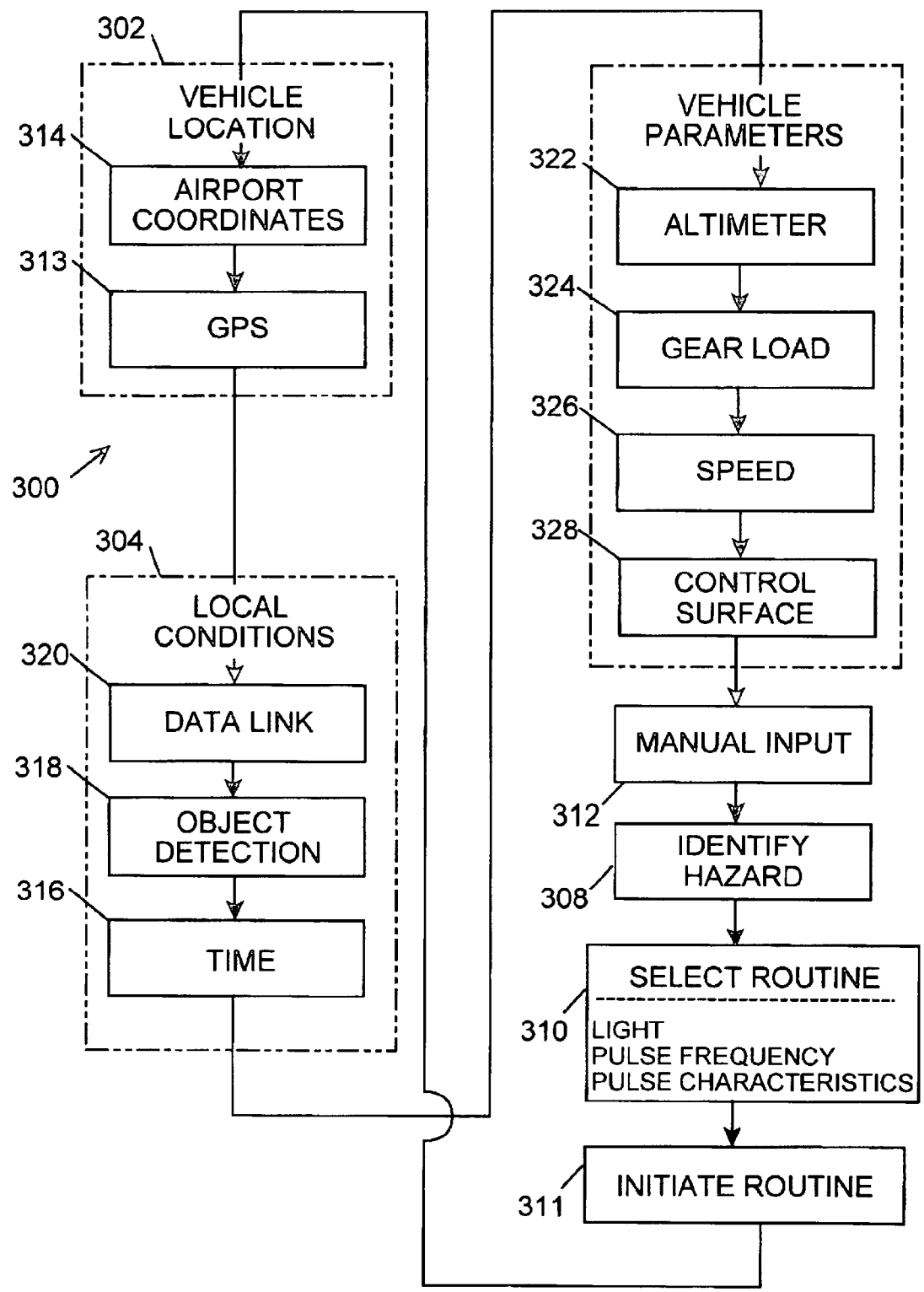
FIG. 4 is a flow diagram for a method of hazard avoidance.

Referring to FIG. 3, one light assembly 30 suitable for use with the hazard avoidance system 100 includes a plurality of light elements or lamps 202-218. The light elements 202–218 may be incandescent lamps or light-emitting diodes (LED), each element emitting light in a frequency spectrum. As illustrated in FIG. 4, the array of light elements includes a white light 218 emitting light throughout the (human) visible spectrum and lights emitting light in the yellow 204, red 206, green 208, violet 212, blue 214, and orange 216 portions of the visible spectrum. In addition, the light array 30 includes a lamp emitting light in the UV portion of the spectrum 202 which is within the visual spectrum of birds and a lamp 210 emitting light in the infrared (IR) portion of the spectrum. In addition to animal hazard avoidance, the IR light is useful in reducing the potential for collisions with other aircraft or vehicles. Aircraft or other vehicles equipped with Enhanced Vision Systems (EVS) utilize an IR sensor to enhance the operator's situational awareness, particularly in darkness, foggy, hazy, cloudy, or other low visibility conditions. The output of the IR sensor is typically added to a heads-up display (HUD) to provide an enhanced visual image of the vehicle's environment. A flashing IR emitter 210 may be used to assist operators of EVS equipped aircraft and vehicles in detecting the vehicle equipped with the hazard avoidance system 100. Each of the lights 202-218 can be illuminated independently by an addressable driver 141 that selectively connects the light element to a power source 105 and controls the voltage to the element in response to signals from the CPU 112 as specified by the instructions of a light illumination routine.

Referring to FIG. 4, generally, the application program for the hazard avoidance method 300 gathers data related to a location of a collision threat 302, conditions at the location of the threatened collision 304, and vehicle operating parameters 306 and utilizes this information to identify the animals most likely to pose a collision hazard 308. The identity of the most likely collision threat is used to select a light illumination routine 310, including identification of at least one light, a pulse frequency for the light, and the characteristics of a light pulse, consistent with the operation of the vehicle and optimal for stimulating the avoidance behavior of the identified animals. The light routine is initiated 311 by the CPU 112 which signals the appropriate drivers 141 to controllably connect a power source 105, in a manner specified by the instructions of the selected routine, to appropriate lights 104–108 identified in the routine. One or more lights 104–106 can be flashed by intermittently connecting the power source 105 through the appropriate drivers 141. The intensity of the light can be varied as the pulse progresses by varying the voltage applied to the light emitter by the driver 141. Varying the pulse frequency of a pair of separated lights can simulate movement of a vehicle and intensify the avoidance behavior of some animals. The inventors also discovered that animals respond more strongly to a light pulse if the intensity of the light changes during the pulse. Increasing the intensity of a light can simulate vehicle motion in the direction of an animal and strengthen the animal's avoidance behavior. For example, tests indicate that brown-headed cowbirds will exhibit avoidance behavior in response to a light source with combined wavelengths of 200 nm to 2600 nm flashing alternately at a pulse frequency of 0.78 Hz.

The method periodically rechecks the location 302, local conditions 304, vehicle parameters 306 and a manual input 312 to determine if a new hazard is to be identified 308 calling for selection 310 and initiation 311 of a different illumination routine.

The hazard avoidance system 100 may utilize a plurality of inputs to establish the identity of a hazard 308 and select an appropriate light illumination routine 310. For example, the hazard avoidance system 100 relates the identity of threatening animals to a location of a threatened collision. The location of a threatened collision may be determined by identifying a particular airport at which an airplane is to land or from which it is to depart. For example, gulls present a significant collision hazard at airports located near bodies of water or sources of food. The coordinates of the destination or departure airport 314 can be input to the hazard avoidance system 100 from the vehicle's navigation system or from a global positioning system (GPS) 313. On the other hand, inputting data relating the vehicle's current location 302 from a GPS 313 or other navigation system, enables the hazard avoidance system 100 to periodically reevaluate animal collision hazards in the immediate locale the as vehicle moves.

To further refine the identification of hazards, the hazard avoidance system 100 adjusts for local conditions at the threat location 304. For example, the time 316, including the day and month, may influence the identification of a hazard. Diurnal birds are not likely to be a hazard when landing an aircraft at night but nocturnal birds, such as owls, and migrating birds may pose a night time hazard. Migrating animals typically pose a hazard at specific locations at particular times of the year and day. Input from an object detection system 318, such as radar, sonar, or IR sensors, may be used to identify characteristics or behaviors distinguishing species of birds or other animals. For example, certain species of birds travel in flocks and others, such as birds of prey, are more likely to be solitary or relatively few in number. The object detection system may also be able to distinguish the size of the detected animals. In addition, a data link 320 can be used to facilitate input from remote observers, such as air traffic controllers, that have observed the presence of an animal hazard, such as raptors hunting over an airfield.

The nature of a potential animal collision hazard is also potentially effected by the momentary operating conditions of the vehicle. While bird strikes during takeoff and landing are the most likely animal collision hazards, collisions with mammals, including coyotes, deer, elk, and caribou, are common and collisions with large birds, such as geese, have been reported at high altitude. The hazard avoidance system 100 receives input from various transducers sensing vehicle operating parameters 306 to aid in the identification of the most likely hazards and selecting an optimal responding illumination routine. For example, input from an aircraft's altimeter 322 can be useful in identifying the species of bird that is the most likely hazard. A landing gear loading transducer 324 can be used to determine when an airplane has left the ground and potentially hazardous species such as deer are no longer a threat.

On the other hand, data inputs from transducers measuring vehicle parameters can be used to select a routine 310 that is not only appropriate for the animal hazard but optimized to the vehicle's operation. For example, the convergence and divergence of separated lights provide a strong visual cue to the direction and speed of a vehicle. By changing the flash rate of separated lights and the intensity of light during an illumination pulse, a high speed approach of a vehicle can be simulated, stimulating a more acute escape response by an animal posing a risk of collision. The hazard avoidance system 100 utilizes a vehicle speed input 326 in optimizing the flash rate and flash intensity characteristics of the light pulses. Likewise, the vehicle operating parameters 306 such as the position of aircraft control surfaces 328 input to the data processing system 110 by transducers or a flight control computer can be used to determine the operating mode of the vehicle and select an illumination routine that is appropriate for the current operating mode of the vehicle.

The data processing system 110 also provides for a manual input 312 through an input device 126 such as a mouse or touch screen. The manual input 312 permits the flight crew to identify an animal collision hazard and input the identification to the data processing system 110 for use in selecting a light illumination routine.

The hazard avoidance system 100 uses various inputs relating a location of a hazard 302, conditions at the location of the threatened hazard 304, vehicle operating parameters 306 and manual input 312 to identify the most likely animal collision hazards 308 and select a light illumination routine 310 consistent with the vehicle's operation and optimized to produce a strong awareness and escape response in the animal posing a collision hazard.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A hazard avoidance system for a vehicle comprising:
    (a) a light arranged on an exterior of said vehicle; and
    (b) a data processing system to determine an identity of an animal hazard to said vehicle and selectively illuminate said light in response to determination of said identity of said animal hazard, said illumination of said light being selected to produce a response by said animal hazard.

2. The hazard avoidance system of claim 1 further comprising an instruction executable by said data processing system relating a vehicle location to said identity of said animal hazard.

3. The hazard avoidance system of claim 1 further comprising
    (a) a positioning system inputting a vehicle location datum to said data processing system; and
    (b) an instruction, executable by said data processing system, relating said identity of said animal hazard and said vehicle location datum.

4. The hazard avoidance system of claim 1 further comprising an instruction executable by said data processing system relating said identity of said animal hazard to a condition at a location.

5. The hazard avoidance system of claim 4 wherein said condition at said location comprises a time.

6. The hazard avoidance system of claim 4 further comprising:
    (a) an object detection device inputting a datum to said data processing system in response to detection of an object; and
    (b) an instruction executable by said data processing system relating said datum to said identity of said animal hazard.

7. The hazard avoidance system of claim 4 further comprising:
    (a) a communication link facilitating input of a datum to said data processing system from a remote source, said datum identifying an animal hazard; and
    (b) an instruction executable by said data processing system relating said datum to a routine for selective illumination of said light.

8. The hazard avoidance system of claim 1 further comprising an instruction executable by said data processing system relating said selective illumination of said light to a condition of said vehicle.

9. The hazard avoidance system of claim 8 wherein said instruction relating said selective illumination of said light to said condition of said vehicle relates illumination of said light to a speed of said vehicle.

10. The hazard avoidance system of claim 1 further comprising an instruction relating an operating mode of said vehicle to said identity of said animal hazard.

11. The hazard avoidance system of claim 10 wherein said instruction relating an operating mode of said vehicle to said identity of said animal hazard comprises an instruction relating an altitude of said vehicle to said identity of said animal hazard.

12. The hazard avoidance system of claim 1 wherein said data processing system selectively alters an intensity of illumination of said light during a period of illumination of said light.

13. The hazard avoidance system of claim 1 wherein said identity of said animal hazard comprises a species of animal.

14. A method of avoiding a collision between an animal and a vehicle comprising the steps of:
    (a) identifying a location of a vehicle;
    (b) relating said vehicle's location to an identity of an animal threatening collision;
    (c) relating said identity of said animal threatening collision to a routine for illuminating a light; and
    (d) illuminating a light on an exterior of said vehicle according to said routine.

15. The method of avoiding a collision of claim 14 wherein the step of illuminating a light on said exterior of said vehicle according said routine comprises the steps of:
    (a) energizing a light element identified in said routine for a first period specified in said routine, said energized light element emitting light of a frequency and an intensity stimulating a vision system of said animal threatening collision with said vehicle; and (b) deenergizing said light element for a second period specified by said routine.

16. The method of avoiding a collision of claim 14 further comprising the steps of:
   (a) determining a condition of said location of said vehicle; and
   (b) relating said condition of said location to said identity of said animal threatening collision.

17. The method of avoiding a collision of claim 14 wherein the step of identifying a location of said vehicle comprises the step of determining a location of said vehicle at a time in the future.

18. The method of avoiding a collision of claim 16 wherein the step of determining a condition of said location of said vehicle comprises the steps of:
   (a) detecting an object;
   (b) determining a behavior of said object; and
   (c) relating said behavior to said identity of said animal threatening collision.

19. The method of avoiding a collision of claim 16 wherein the step of determining a condition of said location of said vehicle comprises the step of receiving a report of an animal collision threat from a remote observer.

20. The method of avoiding a collision of claim 14 further comprising the steps of:
   (a) determining an operating parameter of said vehicle; and
   (b) relating said operating parameter to said identity of said animal threatening collision.

21. The method of claim 20 wherein the step of determining an operating parameter of said vehicle comprises the step of determining one of an altitude of said vehicle, a ground loading of said vehicle, and a position of a control of said vehicle.

22. The method of avoiding a collision of claim 14 further comprising the steps of:
   (a) determining an operating parameter of said vehicle; and
   (b) relating said operating parameter to said routine for illuminating said light.

23. The method of avoiding a collision of claim 14 wherein the step of illuminating said light according to said routine comprises the steps of:
   (a) initiating illumination of said light;
   (b) altering an intensity of said illumination; and
   (c) terminating illumination of said light.

24. An animal collision avoidance system for an aircraft, said system comprising:
   (a) a light element arranged on an exterior of said aircraft;
   (b) a threat datum relating at least one of an aircraft collision threat location, a condition at an aircraft collision threat location, and an operating mode of an aircraft to an identity of an animal posing an aircraft collision threat;
   (c) an illumination routine relating an identity of at least one animal posing an aircraft collision threat to at least one of an illumination pulse period, a light frequency, and an intensity of illumination; and
   (d) a data processing system receiving a datum specifying at least one of a present and a future location of said aircraft, a condition at said aircraft location, and an operating mode of said aircraft, relating a received datum to a threat datum, and illuminating said light element according to an illumination routine appropriate to said received datum.

* * * * *